Patented Jan. 26, 1954

2,667,492

UNITED STATES PATENT OFFICE 2,667,492

METHOD FOR THE RECOVERY OF PRODIGIOSIN

Urs F. Nager, Terre Haute, Ind., assignor to Commercial Solvents Corporation, Terre Haute, Ind., a corporation of Maryland No Drawing. Application November 20, 1950, Serial No. 196,711

10 Claims. (Cl. 260—313)

My invention relates to the antibiotic prodigiosin. More particularly it relates to a method for recovery of prodigiosin from nutrient media in which it is produced.

Prodigiosin is a thermo-stable material produced in nutrient media by the organism *Serratia marcescens*. It is a red pigment which has stimulated interest because of its ability as a contaminent to discolor water and food. Although prodigiosin has been known for a number of years, the antibiotic properties of the material were not recognized until Hettche (Arch. Hyg., 107, 348) first reported its bacterio-static activity against Staphylococci and *Bacillus anthracis* in vitro in 1932. Since that time it has been the subject of considerable study and the structure of the material has been identified as a tripyrryl methene having the empirical formula $C_{20}H_{25}N_3O$ and having the following structural formula:

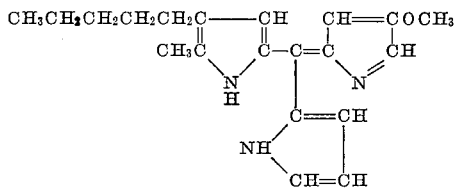

As an antibiotic, prodigiosin is active against Gram positive organisms but is essentially inactive against Gram negative organisms. It also has been found to possess anti-fungal activity and to be fungistatic against the organism *Coccidioides immitis* which causes coccidioidomycosis or San Joaquin Valley Fever.

The antibiotic prodigiosin is produced by and is contained within the cells of the organism *Serratia marcescens* in the form of a salt of prodigiosin, when the organism is grown in nutrient media. In the past, prodigiosin was recovered by extracting this salt from the cells, precipitating the amorphorus hydrochloride salt by passing dry hydrogen chloride into the solution of prodigiosin base, preparing the perchlorate from the hydrochloride and treating the perchlorate with caustic to convert it to free prodigiosin. Such a procedure is cumbersome and productive of only low yields of prodigiosin base. It is apparent then, that a simpler and more direct process for the recovery of prodigiosin was sorely needed in view of the increased importance being attached to prodigiosin as a result of the recent studies mentioned above.

I have now discovered a process for the recovery of prodigiosin from nutrient media in which it is produced, which is both simple and direct and which is productive of high yields of prodigiosin base. My new process eliminates the necessity for forming two different intermediate salts of prodigiosin thus reducing the number of raw materials introduced into the process and also simplifying the procedure.

My new process consists primarily in extracting prodigiosin in the free base form from the cells in which it is produced by the organism *Serratia marcescens*, and concentrating and cooling the resulting solution to crystallize therefrom prodigiosin in the free base form.

In carrying out my invention, I first separate the prodigiosin-containing cells from the fermentation medium by any convenient means such as for example by filtration or centrifugation. In this connection it should be noted that some strains of *Serratia marcescens* produce a gelatinous mucoid-type cell which can only be separated from the nutrient medium by centrifugation. The non-mucoid type cell produced by other strains of *Serratia marcescens*, however, can be easily filtered from the medium, though the use of a common filter-aid will facilitate the filtration step.

The cells obtained in the manner described above are preferably dried and then suspended in a liquid hydrocarbon in order to extract the prodigiosin from the cells. Aliphatic hydrocarbons containing 6 or more carbon atoms such as hexane, heptane, octane, etc., mixtures of aliphatic hydrocarbons such as naphtha, etc., and aromatic hydrocarbons such as benzene, toluene, etc., are suitable for this phase of my invention. I prefer to use heptane to extract the prodigiosin from the cells since the boiling point of heptane is high enough to render the process non-hazardous but yet low enough to enable the concentration to be carried out without the necessity of using a vacuum. The amount of hydrocarbon solvent which I employ depends upon the amount of prodigiosin salt contained in the cells. Generally, the nutrient media in which prodigiosin is produced contain from about 0.2 to about 0.5 mg. of prodigiosin per ml. I have found that about 3 gallons of solvent are required for every pound of filtered cells obtained from nutrient media assaying about 0.5 mg. of prodigiosin per ml. and that about 1.2 gallons of solvent are required for every pound of filtered cells obtained from nutrient media assaying about 0.2 mg. of prodigiosin per ml.

After suspending the prodigiosin cells in the hydrocarbon solvent as described above, I then adjust the pH of the mixture to a value of at least 7 with a base capable of liberating the prodigiosin from the unknown salt form in which it is produced in the cells. I prefer to adjust the pH to a value of about 10 or above since this assumes the liberation of all of the prodigiosin from the salt form. A further requirement of the base used is that while it must free the prodigiosin from the unknown salt form, it must not react with or otherwise combine with the free prodigiosin base. In carrying out this step of my invention, I prefer to use aqueous ammonia to adjust the pH, however, saturated aqueous solutions of alkali metal hydroxides such as for example sodium hydroxide, potassium hydroxide, etc., aliphatic amines such as for example, methylamine, ethylamine, etc., and other organic bases are equally effective in liberating the prodigiosin from the salt form in which it is produced.

Following the pH adjustment, I then agitate the solution for a sufficient length of time to assure complete liberation of the prodigiosin from the salt form and complete extraction of the prodigiosin base from the cells. After allowing the mixture to settle, I then filter, or decant the supernatant containing prodigiosin in the aliphatic or aromatic hydrocarbon solvent, the solution being a one-phase system since the water added with the base is taken up by the cells. This can be done by merely syphoning off the supernatant liquid. I then concentrate and cool the solution which has been decanted in order to crystallize the prodigiosin which can then be separated from the solution by any means, such as, for example, by filtration. In concentrating the solution, I have found that if I concentrate to about one-fifth of the original volume and then cool the concentrated solution I will obtain a first crop of crystals of prodigiosin base. After separation of the first crop of crystals, I can then concentrate the solution further to about one-tenth of its original volume and cool it to obtain a second crop of crystalline prodigiosin base. If the boiling point of the aliphatic or aromatic hydrocarbon solvent is above about 180° C. then vacuum can be advantageously used in the concentration step.

It is apparent that my new process can be carried out as a batchwise process or as a continuous process, the latter affording a substantial saving in solvent used since the solvent can be recycled during the extraction until it has become saturated with prodigiosin. Other advantages in using the continuous process are obvious and I intend for such an embodiment of my invention to be expressly included in this specification and the attached claims.

The following examples are offered to illustrate my invention but it will be understood that any modifications or equivalents thereof which would ordinarily occur to one skilled in the art are to be considered as lying within the scope of my invention.

*Example I*

A 95-pound portion of dried solids separated from a nutrient medium in which the organism *Serratia marcescens* was grown and which contained 645 grams of prodigiosin was suspended in 115 gallons of commercial heptane and agitated for 30 minutes. The pH was then adjusted to 10 with ammonium hydroxide and the resulting mixture agitated for an additional two hours. The solution was then decanted and the heptane extract amounting to 110 gallons found to contain 1.2 milligrams of prodigiosin per ml., a recovery of about 77%. The heptane extract was then concentrated to 20 gallons and cooled to precipitate 384 grams of prodigiosin base which was filtered from the solution. The filtrate was then concentrated to 10 gallons and cooled to precipitate an additional 51 grams of prodigiosin, giving a total yield of 435 grams or an overall recovery of 68%.

*Example II*

A two-gram portion of cells of *Serratia marcescens* calculated to contain 46 mg. prodigiosin was suspended in 50 ml. of benzene and the pH adjusted to 10 with ammonium hydroxide. The mixture was shaken for 30 minutes and then the benzene solution assayed for prodigiosin content. It was found that all of the prodigiosin had been extracted from the cells.

*Example III*

A one-pound portion of dried solids separated from a nutrient medium in which the organism *Serratia marcescens* was grown and which contained 6.8 grams of prodigiosin was suspended in three gallons of commercial heptane and agitated for thirty minutes. The pH was then adjusted to 10 with a 20% aqueous sodium hydroxide solution and the resulting mixture agitated for an additional two hours. The solution was then decanted and the heptane extract amounting to 2.9 gallons found to contain 0.44 milligram of prodigiosin per milliliter, a recovery of 71%. The heptane extract was then concentrated to 0.58 gallon and cooled to precipitate 3.6 grams of prodigiosin base which was filtered from the solution. The filtrate was then concentrated to 0.3 gallon and cooled to precipitate an additional 0.5 gram of prodigiosin, giving a total yield 4.1 grams or an overall recovery of 60.4%.

Now having described my invention what I claim is:

1. A process for the recovery of prodigiosin which comprises extracting prodigiosin from cells of *Serratia marcescens* with a solvent selected from the group consisting of higher boiling aliphatic liquid hydrocarbons having at least 6 carbon atoms and higher boiling aromatic liquid hydrocarbons, the pH of said solvent having been adjusted to at least 7 with an aqueous solution of a base selected from the group consisting of alkali metal hydroxides, ammonium hydroxide, and saturated aliphatic amines, decanting the supernatant liquid, concentrating said supernatant liquid, and cooling to crystallize prodigiosin base.

2. In a process for the recovery of prodigiosin, the steps which comprise suspending prodigiosin salt-containing cells of *Serratia marcescens* in a sovent selected from the group consisting of higher boiling aliphatic liquid hydrocarbons having at least 6 carbon atoms and higher boiling aromatic liquid hydrocarbons, and adjusting the pH of the solvent mixture to at least about 10 with an aqueous solution of a base selected from the group consisting of alkali metal hydroxides, ammonium hydroxide, and saturated aliphatic amines.

3. A process for the recovery of prodigiosin from nutrient media in which it is produced by the organism *Serratia marcescens* which comprises separating the solids from the nutrient medium, suspending the solids in a solvent selected from the group consisting of higher boiling aliphatic liquid hydrocarbons having at least 6 carbon atoms and higher boiling aromatic liquid hydrocarbons, adjusting the pH to at least about 10 with a base selected from the group consisting of alkali metal hydroxides, ammonium hydroxide, and saturated aliphatic amines, agitating the mixture, decanting the supernatant liquid, concentrating said supernatant liquid and cooling to crystallize prodigiosin.

4. In a process for the recovery of prodigiosin, the steps which comprise extracting prodigiosin from cells of *Serratia marcescens* with an aliphatic liquid hydrocarbon containing at least about 6 carbon atoms, the pH of said hydrocarbon having been adjusted to at least about 10 with an aqueous solution of an alkali metal hydroxide.

5. In a process for the recovery of prodigiosin, the steps which comprise extracting prodigiosin from cells of *Serratia marcescens* with an aliphatic liquid hydrocarbon containing at least about 6 carbon atoms, the pH of said hydrocarbon having been adjusted to at least about 10 with ammonium hydroxide.

6. The process of claim 5 wherein the aliphatic hydrocarbon is heptane.

7. In a process for the recovery of prodigiosin, the steps which comprise extracting prodigiosin from cells of *Serratia marcescens* with an aliphatic liquid hydrocarbon containing at least about 6 carbon atoms, the pH of said hydrocarbon having been adjusted to at least about 10 with an aqueous solution of a saturated aliphatic amine.

8. In a process for the recovery of prodigiosin from nutrient media in which it is produced by the organism *Serratia marcescens* the steps which comprise separating the solids from the nutrient medium, suspending the solids in from 1.2 to 3.0 gallons of a solvent selected from the group consisting of higher boiling aliphatic liquid hydrocarbons having at least 6 carbon atoms and higher boiling aromatic liquid hydrocarbons per pound of solids, and adjusting the pH of the mixture to at least about 10 with a base selected from the group consisting of alkali metal hydroxides, ammonium hydroxide, and saturated aliphatic amines.

9. A process for the recovery of prodigiosin from nutrient media in which it is produced by the organism *Serratia marcescens* which comprises separating the solids from the nutrient medium, suspending the solids in from about 1.2 to about 3.0 gallons of heptane per pound of solids, adjusting the pH of the mixture to at least about 10 with ammonium hydroxide, agitating the mixture, decanting the supernatant liquid, concentrating said supernatant liquid, and cooling to crystallize prodigiosin.

10. A process for the recovery of prodigiosin from nutrient media in which it is produced by the organism *Serratia marcescens* which comprises separating the solids from the nutrient medium, suspending the solids in about 3.0 gallons of heptane per pound of solids, adjusting the pH of the mixture to at least about 10 with ammonium hydroxide, agitating the mixture, settling the solids, decanting the supernatant liquid, concentrating said supernatant liquid to about one-fifth of its original volume, cooling to crystallize prodigiosin base, separating the prodigiosin crystals, concentrating the remaining solution to one-half of its volume, and cooling to crystallize additional prodigiosin base.

URS F. NAGER.

References Cited in the file of this patent

Florey et al.: "Antibiotics," Oxford Univ. Press, 1949, pp. 559–61, 1572.

Wrede et al.: "Über das Prodigiosin" Berichte, vol. 62, 1929, pp. 2678–2685.